March 17, 1931.    S. McMULLAN    1,796,853
MOLDING APPARATUS
Filed July 15, 1929
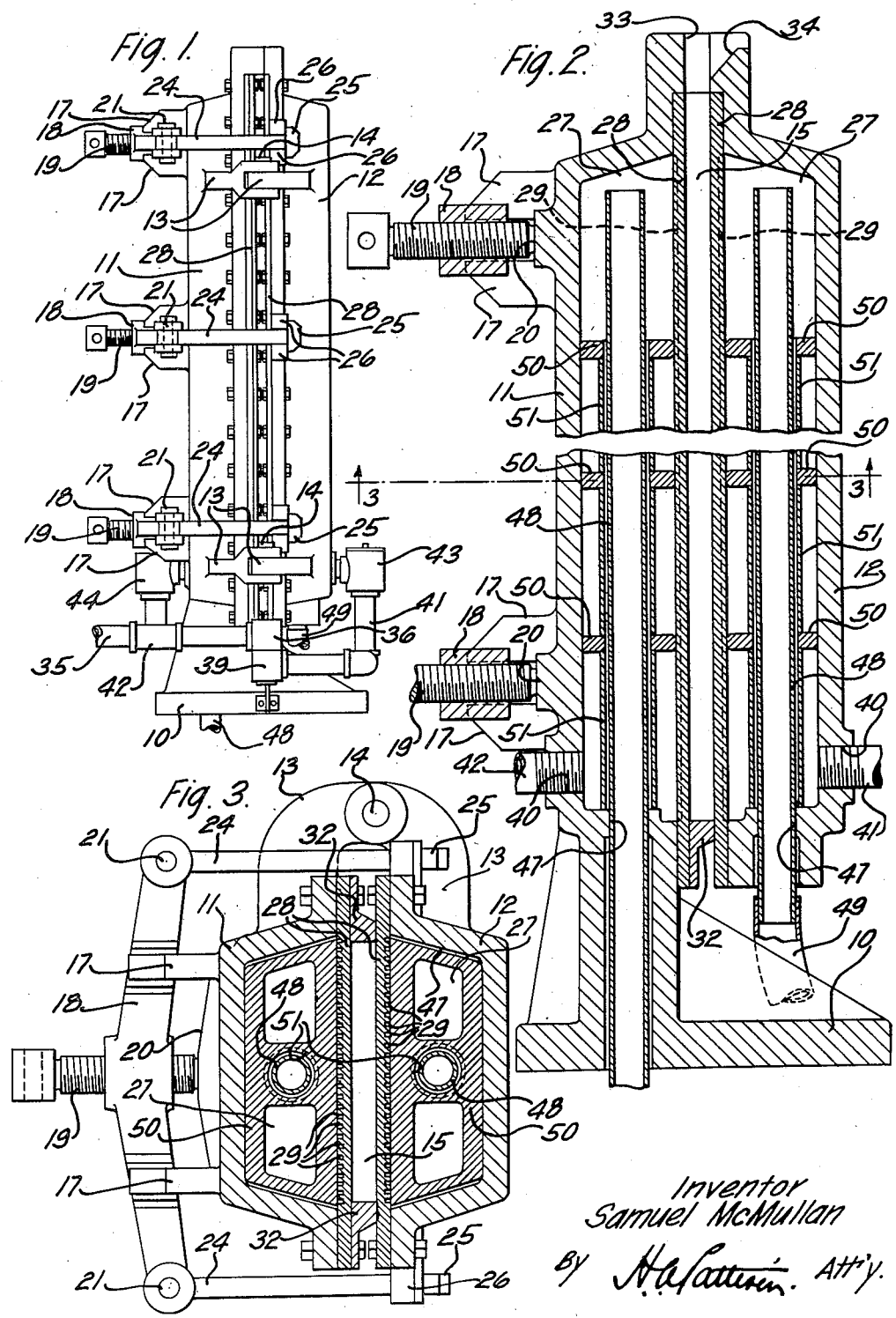
Inventor
Samuel McMullan
By H. A. Patterson, Att'y.

Patented Mar. 17, 1931

1,796,853

UNITED STATES PATENT OFFICE

SAMUEL McMULLAN, OF DOWNERS GROVE, ILLINOIS, ASSIGNOR TO WESTERN ELECTRIC COMPANY, INCORPORATED, OF NEW YORK, N. Y., A CORPORATION OF NEW YORK

MOLDING APPARATUS

Application filed July 15, 1929. Serial No. 378,274.

This invention relates to molding apparatus, and more particularly to chill molds for casting metal sheets.

The primary object of this invention is to provide a simple and efficient molding apparatus.

In accordance with the general features of this invention in one embodiment thereof as applied to the casting of metal plates, a plurality of separable mold sections cooperating when in operative relation to form a mold chamber and retained in such position by a plurality of clamping devices are provided. Each mold section comprises outer and inner walls spaced from each other by a cooling chamber. The outer opposed surfaces of the inner walls of the sections are smooth and serve as opposite sides of the molding chamber, and the inner surfaces thereof are corrugated or grooved to increase the heat radiating surface. Buckling of the inner walls is prevented by a plurality of spaced, loose grids supported on intermediate loose sleeves surrounding cooling medium outlet pipes projecting through the bottom walls of the sections and terminating adjacent the upper inner surfaces thereof, the cooling medium supply entering the cooling chambers through apertures provided in the outer walls thereof.

Other objects and advantages of this invention will more fully appear from the following detailed description, taken in connection with the accompanying drawing, in which Fig. 1 is a side elevation of a molding apparatus embodying the invention;

Fig. 2 is an enlarged fragmentary vertical detail section of the apparatus shown in Fig. 1, and Fig. 3 is a horizontal detail section taken on the line 3—3 of Fig. 2.

Referring now to the drawing in detail wherein like reference numerals refer to similar parts, a base 10 for securing the molding apparatus to a supporting member (not shown) is formed integral with a mold section 11. A cooperating mold section 12 is pivotally mounted on the section 11 by means of a plurality of laterally extending apertured lugs 13 formed on each of the sections and hinged together by pins 14 projecting through the apertures of the lugs (Figs. 1 and 3), so that the mold section 12 may be rotated into operative relation with the mold section 11 to form a mold chamber 15, which will be referred to in greater detail shortly, or swung into open position for the removal of a plate or slab of solidified material (not shown) formed in the mold chamber. Formed upon and projecting from the left side of the section 11, as viewed in the drawing, is a plurality of sets of lugs 17 arranged horizontally in spaced pairs at different vertical planes for guiding clamp bars 18, each bar being slidable between the lugs 17 of each set forming each horizontal pair, as clearly shown in Fig. 3. Intermediate the lugs 17 the bars 18 are each provided with a threaded aperture for receiving a clamp screw 19 (Fig. 3), which at its inner end engages a lug 20 also formed on the left side of the section 11. The screw 19 is formed with a circular apertured head for receiving a tool or pin (not shown) whereby the screw may be readily rotated.

Opposite ends of the bars 18 are each bifurcated and between the furcations thereof is pivoted, as indicated at 21, one end of a bar 24, the opposite end of the latter having a head 25 projecting laterally from each side of the bar and engaging at opposite ends a set of spaced lugs 26 formed upon the mold section 12, each of the bars extending between a set of the spaced lugs. It will be apparent that with the bars 24 swung into position as shown in Figs. 1 and 3 with the heads 25 thereof in operative engagement with the lugs 26 and with the clamp screws 19 tightened up against the lugs 20 provided upon the mold section 11, the mold sections will be retained in operative position. Furthermore when the molding operation is completed that upon loosening the clamp screws 19 sufficiently from the lugs 26 the clamp bars 18 will slide inwardly upon the lugs 17 and carry the heads 25 of the bars 24 away from the lugs and permit the bars to be swung outwardly about their pivots 21 so that the mold section 12 may be rotated into its open position, as hereinbefore mentioned.

The mold sections 11 and 12 are each provided with a cooling chamber 27 closed upon its inner side with a comparatively thin wall or plate 28 preferably made of bronze or copper to increase the heat radiating constant. The outer opposed surfaces of the inner walls 28 are smooth and serve as opposite sides of the molding chamber 15 and the inner surfaces thereof are provided with corrugations or channels 29 extending lengthwise of the mold sections 11 and 12 to increase the heat radiating surface. Although the channels 29 are described as extending lengthwise of the mold sections 11 and 12 it will be understood that they might extend transversely thereof or extend in both directions. Fixed to the mold section 11 at the time of securing the wall or plate 28 thereto are spacer members 32, preferably made of bronze or copper, which serve as the bottom and ends of the molding chamber 15, the top being left open as indicated at 33 so that the molten metal may be poured into the molding chamber in a usual manner, the upper end of the section 12 being provided with an enlarged opening 34 to facilitate the pouring operation.

The cooling chambers 27 are supplied with a cooling medium, such as flowing water or brine, in the following manner: Referring particularly to Fig. 1 a water supply pipe 35 is connected to a hollow hinge member 36 fixed to the stationary mold section 11 directly in line with the vertical axis of the hinge pins 14 around which the rotatable mold section 12 oscillates. A hollow hinge member 39 is connected to the mold section 12 and moves therewith, the two hinge members 36 and 39 cooperating to provide a path for the cooling water from the supply pipe 35 at all positions of the movable mold section 12. The hinge member 39 is connected to an aperture 40 formed in the outer side wall of the mold section 12 adjacent its lower end leading to the cooling chamber 27 (Fig. 2) by piping 41 and the supply pipe 35 is similarly connected to the cooling chamber 27 of the mold section 11 by piping 42 tapped off the supply pipe 35 before its connection to the hollow hinge member 36. Water inlet valves 43 and 44 are included in the pipings 41 and 42, respectively, for controlling the water to the cooling chambers 27.

Extending through apertures 47 provided in the bottom walls of mold sections 11 and 12 are vertically extending water outlet members or pipes 48 terminating adjacent the upper inner surfaces thereof. The lower ends of the outlet pipes 48 extend from the bottom walls of the mold sections 11 and 12 and may be connected to a drain, the pipe 48 of the movable mold section 12 being connected to the drain by a flexible hose 49.

To prevent deformation or buckling of the inner copper walls or plates 28 which form opposite sides of the molding chamber 15 during the molding operation, which plates are relatively thin compared to the walls opposite thereto, a plurality of spaced loose perforated members or grids 50, preferably made of bronze to increase the heat radiating constant, are supported on intermediate loose sleeves 51 fitted over and surrounding the outlet pipes 48, the grids fitting loosely around the walls of the cooling chambers 27, as clearly shown in Fig. 3. By utilizing the water outlet pipes 48 for positioning the sleeves 51 and the grids 50 with the latter predeterminedly spaced by the sleeves it will be apparent that the casting of the mold sections 11 and 12 is simplified for preventing deformation of the thin inner walls of the molding chamber. Furthermore, by providing grids free of the walls of the mold sections they may be made of material different from that of the section to increase the heat radiating constant.

In the operation of the hereinbefore described molding apparatus the movable mold section 12 is clamped to the stationary mold section 11 in the manner previously described by means of the clamp screws 19 and the elements cooperating therewith and the cooling medium supply 35 is connected to a suitable supply source, such as water or brine. The water will thus flow continuously through the hollow hinge members 36 and 39 and the associated pipings 41 and 42 into the lower end of each of the cooling chambers 27, filling the latter and flowing out through the outlet pipes 48, thus serving to rapidly and continuously absorb the heat from the thin plates 28 due to the molten metal poured into the molding chamber 15 at its upper end 33, and thereby cause the chilling of the plates, the grids 50 also serving to increase the absorption of the heat from the plates, which is immediately taken off by the flowing cooling medum.

Upon the molten metal becoming solidified into a slab within the molding chamber 15 the clamp screws 19 are released in the manner hereinbefore described to permit the movable mold section 12 to be rotated about its hinges away from the section 11, the slab resting on the bottom spacer member 32 (Fig. 2), in which position it may be readily removed.

Although the invention has been disclosed and described as applied to an apparatus for molding slabs, it is clear that it may have a

What is claimed is:

1. In a molding apparatus, a plurality of mold sections, each provided with a cooling chamber and cooperating to form a mold chamber, and a plurality of differently shaped unattached means alternately arranged between the opposed walls of each section within the cooling chamber cooperating to prevent deformation of the walls during the molding operation.

2. In a molding apparatus, a plurality of mold sections, each provided with a cooling chamber and cooperating to form a mold chamber, means between the walls of each section for preventing deformation of the opposed walls of the molding chamber during the molding operation and increasing the heat radiation, said means comprising a plurality of predeterminedly spaced bronze grid members free of the walls of the section, and means intermediate the grid members for supporting the latter members.

3. In a molding apparatus, a plurality of mold sections, each provided with a cooling chamber and cooperating to form a mold chamber, the inner surfaces of opposed walls of the sections formed to increase the heat radiating surface with the outer surfaces of the walls serving as opposite sides of the molding chamber, the sections each provided with an aperture for passing a cooling medium into the cooling chambers, an outlet member for the medium extending into and along each of the chambers, and means associated with the members for preventing deformation of the opposed walls of the sections during the molding operation.

4. In a molding apparatus, a plurality of mold sections, each provided with a cooling chamber and cooperating to form a mold chamber, a copper plate forming one side wall of each of the sections and opposite sides of the molding chamber, the inner surfaces of the plates formed to provide a maximum heat radiating surface, the sections each provided with an aperture for the entrance of a cooling medium into the cooling chambers, an outlet member for the medium extending into and along each of the cooling chambers, and bronze means associated with the members for preventing deformation of the opposed copper walls of the sections during the molding operation and increasing the heat radiation.

5. In a molding apparatus, a plurality of mold sections, each provided with a cooling chamber and cooperating to form a mold chamber, the sections each provided with an aperture for the entrance of a cooling medium into the cooling chambers, an outlet member for the medium extending into and along each of the cooling chambers, and means surrounding the members for preventing deformation of the opposed walls of the cooling chambers during the molding operation.

6. In a molding apparatus, a plurality of mold sections, each provided with a cooling chamber and cooperating to form a mold chamber, the sections each provided with an aperture adjacent its bottom for the entrance of a cooling medium into the cooling chambers, an outlet member for the medium from each chamber extending thereinto from its bottom and terminating near its top, and means surrounding the members for preventing deformation of the opposed walls of the cooling chambers during the molding operation.

7. In a molding apparatus, a plurality of mold sections, each provided with a cooling chamber and cooperating to form a mold chamber, the sections each provided with an aperture for the entrance of a cooling medium into the cooling chambers, an outlet member for the medium extending into and along each of the cooling chambers, a plurality of free members mounted around the outlet members, and a plurality of grid elements freely supported upon and separating the free members for preventing deformation of the opposed walls of the cooling chambers during the molding operation.

8. In a molding apparatus, a plurality of mold sections, each provided with a cooling chamber, the sections pivotally connected and cooperating to form a mold chamber, clamping elements for securing the sections in operative position, the sections each provided with an aperture for the entrance of a flowing cooling medium into the cooling chambers, an outlet member for the medium extending into and along each of the cooling chambers, and means associated with the members for preventing deformation of the opposed walls of the cooling chambers during the molding operation.

9. In a molding apparatus, a plurality of mold sections, each provided with a cooling chamber, one of the sections having a base for supporting the apparatus, the sections pivotally connected in a vertical axis and cooperating to form a mold chamber, clamping elements for securing the sections in operative position, the sections each provided with an aperture adjacent its bottom for the entrance of a flowing cooling medium into the cooling chambers, a vertical outlet member for the medium extending thereinto from its bottom and terminating near its top, and means freely surrounding the members for preventing deformation of the opposed walls of the cooling chambers during the molding operation.

10. In a molding apparatus, a plurality of mold sections, each provided with a cooling chamber and cooperating to form a mold chamber, the sections each provided with an aperture adjacent its bottom for passing a cooling medium into the cooling chambers, a vertical outlet pipe for the medium entered in each chamber extending thereinto and substantially the entire height thereof, and a plurality of differently shaped perforated members alternately stacked along and surrounding the outlet pipes and cooperating to prevent deformation of the opposed walls of the cooling chambers during the molding operation.

In witness whereof, I hereunto subscribe my name this 29th day of June, A. D. 1929.

SAMUEL McMULLAN.